United States Patent [19]
Blankenship

[11] Patent Number: 5,357,076
[45] Date of Patent: * Oct. 18, 1994

[54] PLASMA TORCH WITH IDENTIFICATION CIRCUIT

[75] Inventor: George D. Blankenship, Chardon, Ohio

[73] Assignee: The Lincoln Electric Company, Cleveland, Ohio

[ * ] Notice: The portion of the term of this patent subsequent to May 4, 2010 has been disclaimed.

[21] Appl. No.: 970,387

[22] Filed: Nov. 2, 1992

Related U.S. Application Data

[62] Division of Ser. No. 684,310, Apr. 12, 1991, Pat. No. 5,208,436.

[51] Int. Cl.$^5$ .............................................. B23K 9/10
[52] U.S. Cl. ............................................... 219/121.54
[58] Field of Search ...................... 219/121.54, 121.36, 219/130.1, 132, 98; 483/7-9; 364/474.01

[56] References Cited

U.S. PATENT DOCUMENTS

| | | | |
|---|---|---|---|
| 2,597,689 | 5/1952 | Welch, Jr. | 219/130.4 |
| 3,519,785 | 7/1970 | Vetter | 219/114 |
| 4,415,792 | 11/1983 | Jordan | 219/98 |
| 4,486,650 | 12/1984 | Bridgstock et al. | 219/544 |
| 4,571,488 | 2/1986 | Reeves | 219/544 |
| 4,588,339 | 5/1986 | Bilz | 40/629 |
| 4,620,362 | 11/1986 | Reynolds | 483/9 |
| 4,720,907 | 1/1988 | Rapp | 483/9 |
| 4,804,811 | 2/1989 | Raycher et al. | 219/130.1 |
| 4,839,499 | 6/1989 | Kotecki et al. | 219/121.39 |
| 5,014,210 | 5/1991 | Postlewait et al. | 364/477 |
| 5,170,042 | 12/1992 | Bunn | 219/497 |
| 5,171,967 | 12/1992 | Schwiete | 219/130.1 |

FOREIGN PATENT DOCUMENTS

| | | | |
|---|---|---|---|
| 111693 | 10/1983 | European Pat. Off. | 483/9 |
| 2741469 | 9/1977 | Fed. Rep. of Germany . | |
| 277169 | 3/1990 | Fed. Rep. of Germany | 483/8 |
| 3919699 | 3/1991 | Fed. Rep. of Germany | 483/9 |
| 54-136547 | 4/1978 | Japan . | |
| 55-120478 | 3/1979 | Japan . | |
| 60-64773 | 4/1985 | Japan . | |
| 61-63368 | 4/1986 | Japan . | |
| 8701798 | 3/1987 | PCT Int'l Appl. | 483/9 |
| 1235113 | 6/1971 | United Kingdom . | |
| 2234702 | 2/1991 | United Kingdom . | |

*Primary Examiner*—Bruce A. Reynolds
*Assistant Examiner*—John A. Jeffery
*Attorney, Agent, or Firm*—Vickers, Daniels & Young

[57] ABSTRACT

A unique torch assembly having specific characteristics determinative of the desired operating parameters of the torch assembly wherein the torch assembly has a connector plug for selectively connecting the torch assembly onto a universal control station for providing electrical power and gas to said torch assembly, which power and gas flow are to match said operating parameters of the torch assembly. The assembly is provided with an identification circuit for identifying unique torch assemblies with the identification circuit having an electrical property unique to said specific characteristics of unique torch assembly and is also provided with an arrangement to interrogate the identification circuit to sense said electrical property of the circuit. In this manner, the torch assembly can be positively identified.

30 Claims, 6 Drawing Sheets

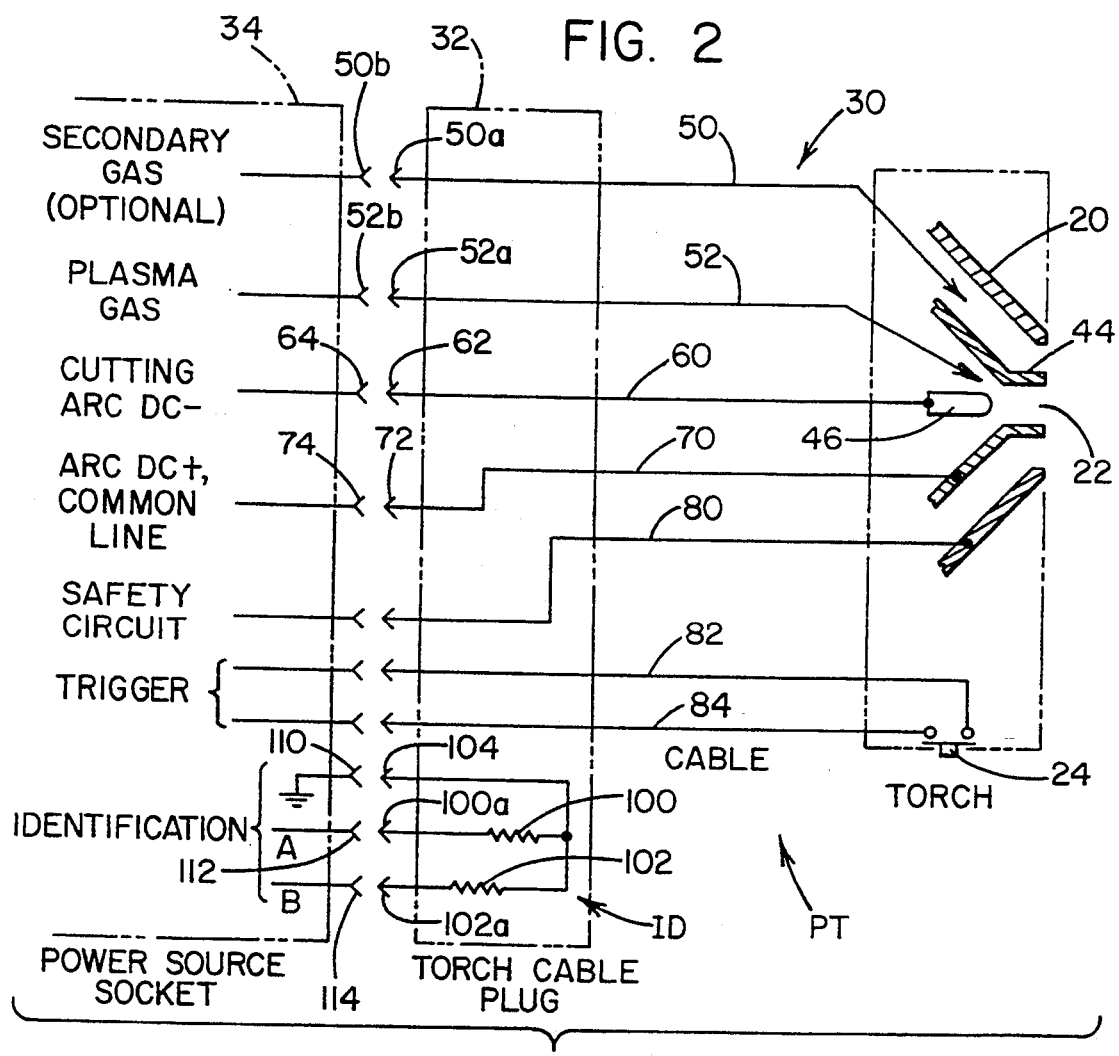
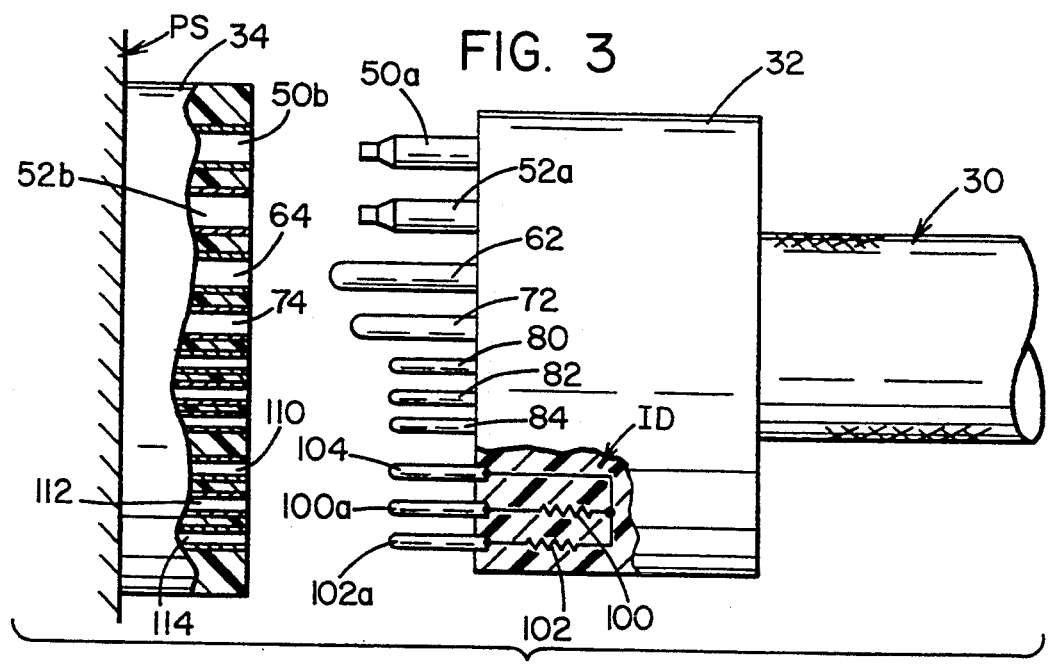

FIG. 8

| LIMITS | 5.5 VDC SUPPLY TARGET | TARGET | HEX NUMBER LIMITS |
|---|---|---|---|
| 0.40V | | | $12-IDLIM1 |
| | 0.50V (24.9) | $17 | |
| 0.60V | | | $1B-IDLIM2 |
| | 0.70V (36.5) | $20 | |
| 0.80V | | | $25-IDLIM3 |
| | 0.90V (48.7) | $2A | |
| 1.00V | | | $2E-IDLIM4 |
| | 1.10V (61.9) | $33 | |
| 1.20V | | | $37-IDLIM5 |
| | 1.30V (76.8) | $3C | |
| 1.40V | | | $40-IDLIM6 |
| | 1.50V (93.1) | $45 | |
| 1.59V | | | $49-IDLIM7 |
| | 1.69V (110) | $4E | |
| 1.79V | | | $53-IDLIM8 |
| | 1.89V (130) | $58 | |
| 1.98V | | | $5C-IDLIM9 |
| | 2.07V (150) | $60 | |
| 2.18V | | | $65-IDLIM10 |
| | 2.29V (178) | $6A | |
| 2.38V | | | $6E-IDLIM11 |
| | 2.48V (205) | $73 | |
| 2.58V | | | $77-IDLIM12 |
| | 2.68V (237) | $7C | |
| 2.78V | | | $80-IDLIM13 |
| | 2.88V (274) | $85 | |
| 2.98V | | | $8A-IDLIM14 |
| | 3.08V (316) | $8F | |
| 3.17V | | | $93-IDLIM15 |
| | 3.27V (365) | $98 | |
| 3.36V | | | $9C-IDLIM16 |
| | 3.46V (422) | $A1 | |
| 3.56V | | | $A5-IDLIM17 |
| | 3.67V (499) | $AA | |
| 3.77V | | | $AE-IDLIM18 |
| | 3.87V (590) | $BB | |
| 3.96V | | | $B7-IDLIM19 |
| | 4.05V (698) | $BC | |
| 4.15V | | | $CC-IDLIM20 |
| | 4.25V (845) | $C5 | |
| 4.35V | | | $CA-IDLIM21 |

PLASMA TORCH WITH IDENTIFICATION CIRCUIT

This is a division of application Ser. No. 684,310 filed Apr. 12, 1991, now U.S. Pat. No. 5,208,436.

The invention relates to the art of torches for cutting, welding, brazing and other purposes and more particularly to a plasma torch of the type including an arc for creating a plasma which torch is employed for the purposes of cutting, welding, etc. More specifically, the invention relates to a torch of the type which includes a system for automatically identifying the torch.

BACKGROUND OF INVENTION

The invention is primarily applicable for use in a plasma arc torch and it will be described with particular reference thereto; however, the invention has much broader applications and may be used with various torches which are connected to a universal control station or power supply for the purpose of directing power and/or gases to the torch in desired amounts for the purposes of welding, cutting, brazing and other heat related processes. When using plasma for heat processing, a torch is connected to a universal control station which directs the arc current, plasma gas and auxiliary cooling gas, together with electrical current from the universal control station to the torch body or housing. A torch or torch assembly includes the housing on one end, a long flexible cable and a plug on the other end. The cable is employed with the end plug for connecting the torch housing or body onto the control station which includes both the power supply and the supply of gaseous material. The station also contains the microprocessor or other control system for operating the power supply, gas supply and torch itself. Consequently, it is somewhat standard practice to provide the end plug with a specific arrangement of nipples and electrical connectors or terminals for connecting the plug to the stationary universal control station with the gas lines, arc current leads and control conduits all automatically connected in unison.

An operator obtains a torch housing, hose and connector as an assembled unit and manually connects the plug or connector of this assembly onto the power supply or universal control station. The mere connection of the plug to the power supply or control station implements the desired operation of the torch in accordance with the settings of the control station. A unique torch assembly is required for a particular plasma operation. As the operation changes a different torch assembly may be necessary. For this reason, when each connection of the plug to the power supply is made, the operator must adjust the power, gas flow and other desired operating parameters for the specific torch being employed. The operator will thus be assured that the proper settings are made at the power supply.

In a particular facility, many torches having different desired operating parameters are available to be operated by the same universal control station. For this reason, the operator must identify the particular torch being used and be aware of the desired operating parameters to be set for that particular torch. This presents certain disadvantages. The manual setting of the power supply may be erroneous since the operator is often under pressure and is performing the work in a somewhat adverse environment. In addition, the torch selected by the operator for the particular operation may be the incorrect torch. In this situation, the power supply may be adjusted or set for one torch and another torch is actually attached to the power supply. This can be harmful to the equipment. Since plasma torches must be repaired and rebuilt often and replaced by the operator, the need for setting, selecting and otherwise implementing the use of a new torch is extremely common and must be done often by an operator. If the torch is incorrect or the settings are inconsistent with the desired operating parameters for the torch, the torch may not operate efficiently, may not operate at all or may be rapidly deteriorated or be destroyed in a short time. For this reason, facilities establish elaborate systems for identifying torches, coding the torches, documenting desired operating parameters and otherwise assisting the operator in selecting the proper torch and implementing the desired operating parameters for the torch after it has been connected to the power supply or control station. This procedure is costly and, in some respects, is somewhat ineffective since it demands a high level of human input and often results in selection and setting errors.

The present invention overcomes the difficulties in selecting the proper unique torch for a given operation and being assured that the desired operating parameters for the individual plasma torch are set at the power supply or control station used to actuate one of many different torches.

In accordance with the present invention there is provided an improvement in a torch, such as a plasma torch, having specific design features which determine the specific operating characteristics of the torch, wherein the torch has connector means, such as a long flexible cable and plug, for selectively connecting the torch onto a control station for providing electrical power and gas flow to the torch, which electrical power and gas flow are to be matched to the operating parameters of the torch. The improvement in this torch comprises an identification circuit for identifying the torch, wherein the identification circuit has an electrical property unique to the specific characteristics of the torch and means for interrogating the identification circuit to sense the electrical property of the identification circuit. In this manner, the torch itself can be automatically identified by interrogating the identification circuit mounted on the torch. This identification circuit may be located in the torch housing or it may be located in the plug at the end of the flexible cable, which plug connects the torch assembly to the power supply. When the connector, or plug is attached to the universal control station or power supply, the identification circuit in the torch can be interrogated for identifying the torch connected to the power supply. In this manner, the power supply or control station accurately identifies the particular torch connected at its output socket at any given time. In accordance with this concept, the power levels, gas flows and other parameters of the control station can be automatically adjusted by the onboard computer or microprocessor to provide a closed loop system and method wherein the mere connection of a torch will effect an automatic adjustment of the desired operating parameters for optimum operation of the particular torch identified by a circuit carried on the torch. The torch includes both the flexible cable and connector plug, which plug has a pattern of nipples and electrical connects matching a companion socket on the power supply station for the plasma operation.

In accordance with another aspect of the present invention the identification circuit on the torch includes a resistor and the electrical property being interrogated is the approximate resistance of the resistor. This is done, in accordance with the preferred embodiment of the invention, by allowing a voltage of a known value to be applied to a network consisting of a fixed resistor within the control station or power supply and the torch mounted resistor whereby the voltage across the torch mounted resistor is the electrical property of the identification circuit. By selecting a different resistor or resistor network for each of the various torches to be identified, the detected or measured voltage or voltages can be compared and processed to determine the specific identity of the torch connected onto the power supply or control station.

In accordance with one aspect of the invention, the identification circuit is located in the torch housing itself whereas in another aspect of the invention the identification circuit is located in the plug. Since the plug, cable and torch are assembled preparatory to use, both locations of the identification circuit are acceptable. A torch or torch assembly are used interchangeably as only the actual housing or the three components. In the preferred embodiment, the identification circuit is in the torch housing itself since this will assure that the proper torch identification is made without the need for maintenance and manufacturing personnel to make the desired selection by placing the identification circuit in the plug at the end of the flexible cable of the torch assembly. It is appreciated that the torch is broadly defined as including the connector means itself for the purpose of showing that the identification circuit may be located anywhere, as long as it is carried by the torch. The torch can, in this manner, be accurately identified when the plug at the end of the flexible cable is attached to the power supply.

In accordance with another aspect of the preferred embodiment of the invention, the identification circuit is a resistor network including two separate resistors and the electrical property that identifies the torch is the resistance of each of these resistors in a coded combination. In this manner, a first voltage is created that is indicative of the resistance of a first resistor. A second voltage is created which is indicative of the resistance of a second resistor. By using these two separate voltages and separating the voltage range into several distinct levels, the identification code for the plasma torches has two number digits and each number can have several digits. This multiplies the number of torches which can be identified in accordance with the system used in the present invention. To further increase the number of identifiable torches, a third resistor could be used for the purpose of creating a third voltage which could be divided into distinct ranges and would again double the number of torches that could be identified by using the present invention. It has been found that the use of two resistors is preferred and a convenient means for identifying several hundred different specific types of plasma torches.

In accordance with another aspect of the present invention there is provided external means for digitizing the detected resistance of each of the resistors and means for comparing each of the digitized resistances to a two dimensional digital grid having numerical segments assigned to groups of digital coordinates with each of the segments indicative of a particular torch and means for outputting the numerical segment encompassing the detected resistance of the resistors. In this manner, a microprocessor or onboard computer of the control station has a read only memory (ROM) containing a map or table that is a network having A coordinates divided into a selected number of segments, such as 20 and the B coordinates divided into a similar number of numerical segments. In this manner, the map or table is a matrix including 20×20 numerical segments, each of which is approximately 9 bits wide and 9 bits long to identify 400 different torches. In this manner, the digitized voltages from reading the various resistors will be within the specific numerical area of a ROM with the various ROM areas assigned to a given torch. Variations in the resistance and in the digitizing of the voltage will not cause misidentification since areas in the ROM are relatively large for each individual torch to be identified. The actual scheme is shown in FIGS. 7 and 8. Other arrangements could be employed for using one or more resistors or other electrical properties to create a voltage which can be digitized, divided into segments or ranges and compared with a numerical pattern to output the identification of a specific, plasma torch.

The present invention also involves a system for automatically identifying a plasma torch having specific design features. The torch has an identification circuit means for identifying the torch, as described above, so that the identification circuit has an electrical property unique to the specific design features of the torch being identified. The torch also has means for interrogating tile identification circuit such as output leads for directing a known current to the identification circuit. The system of the present invention includes means on the control station or power supply for activating the torch interrogation means when the torch is connected to the power supply and means external of the torch for reading the electrical properties of the identification circuit on the torch when the interrogation means of the torch is activated. This system allows for the automatic interrogation and identification of a variety of torches by merely connecting them to the power supply or control station. The system includes the onboard computer for digitizing the voltages indicative of the resistance of the various resistors used in the circuit on the torch and for comparing this digitized resistance to a two dimensional digital grid, such as a read only memory (ROM) map or table having numerical segments assigned to groups of coordinates so that the particular segment or area into which the digitized voltage falls is indicative of a particular torch. Means are also provided for outputting the numerical segment encompassing the selected resistances of the resistors to identify the torch. When the torch is identified, the control station can be adjusted to the proper operating parameters. In the alternative, the control station is adjusted to known operating parameters and the identified torch is rejected if it is not the proper torch.

There is also provided a method for automatically identifying a plasma torch as it is connected to a power supply, which method includes the steps of providing the torch with an identification circuit fixedly associated with the torch for identifying the torch wherein the identification circuit has an electrical property unique to the torch and the step of interrogating the identification circuit to sense the electrical properties so that the torch is identified. This method also includes the steps of comparing the sensed electrical property to a table identifying the specific torches by the electrical property of the identification circuit. This method further includes the concept of setting the desired operating parameters of the power supply by the automatically identified specific torch connected to the power supply and setting the power supply accordingly. In addition, the method can include the additional step of inhibiting the control station or power supply if a sensed property is a preselected value indicating that the torch is wrong or no torch is in place. In this manner, if a torch is connected to the power supply and is not identified or is not a proper torch for a particular power supply setting, the method employs the steps of inhibiting the power supply until proper torch identification has been obtained or a manual override procedure has been performed.

The primary object of the present invention is the provision of an identification system and method for automatically identifying the type of torch connected to a power supply and the improvement in a torch for accomplishing this purpose.

Yet another object of the present invention is the provision of a system, method and improved torch, as defined above, which system, method and improved torch allows for automatic identification of a large number of torches as a torch is connected to a power supply. This object reduces the possibility of an improper torch and/or an improper torch setting for a plasma operation.

Yet another object of the present invention is the provision of a system, method and improved torch, as defined above, which system and method allows for the automatic adjustment of the power supply in the control station of a plasma operation in accordance with the automatic identification of a torch connected to the power supply, so that the proper operating parameters will be used with a given torch.

These and other objects and advantages will become apparent from the following description taken together with the accompanying drawings.

BRIEF DESCRIPTION OF DRAWINGS

FIG. 2 is a schematic view and wiring, or plumbing, diagram of the preferred embodiment of the present invention;

FIG. 3 is an enlarged side elevational view taken generally along line 3—3 of FIG. 1 showing the plug and power supply socket used in the preferred embodiment of the present invention as shown in FIG. 2;

PREFERRED EMBODIMENT

Figure 1:
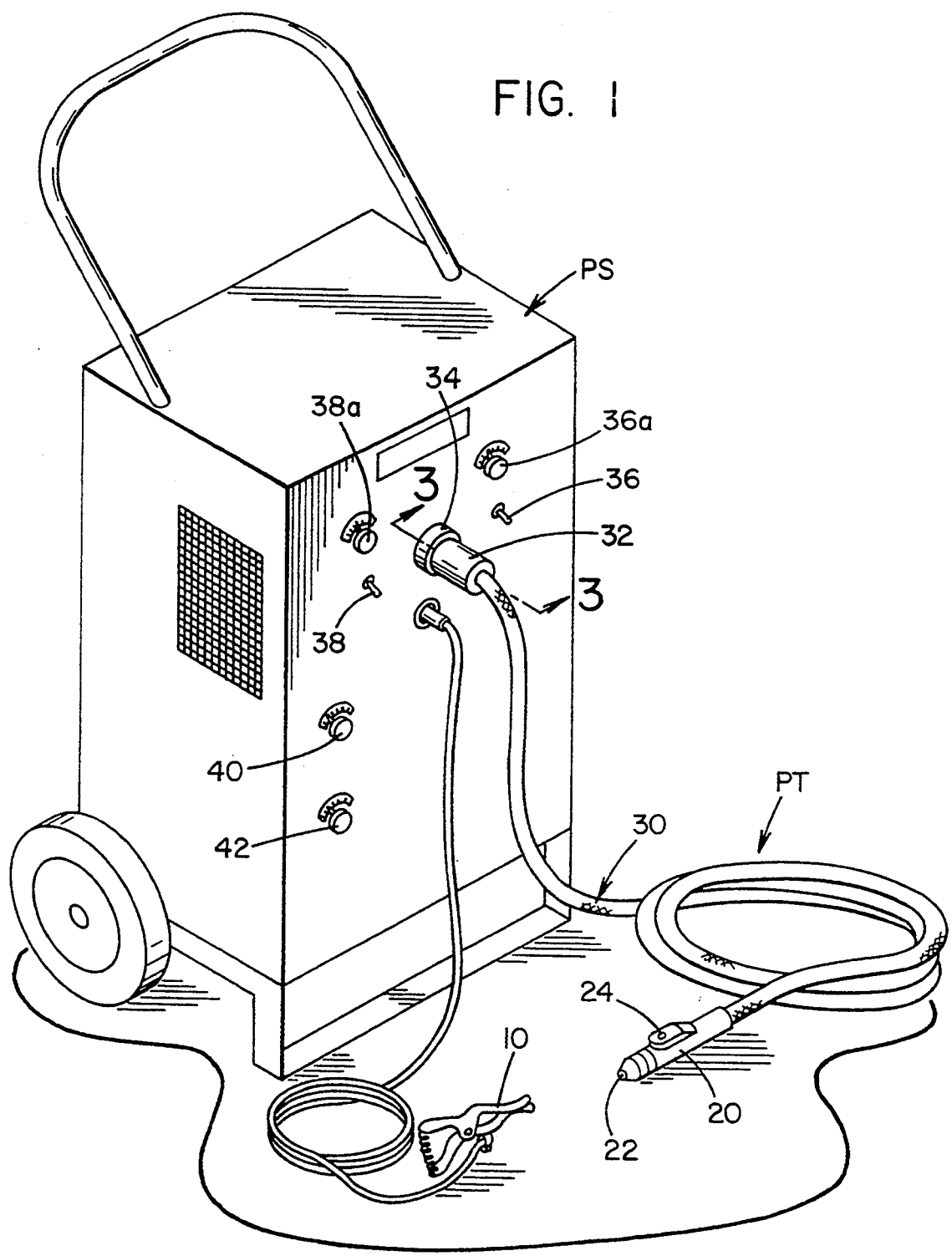
FIG. 1 is a pictorial view of a plasma system to which the present invention is used.

Referring now to the drawings wherein the showings are for the purpose of illustrating a preferred embodiment of the invention only and not for the purpose of limiting same, FIG. 1 shows a somewhat standard plasma system wherein a power supply PS is used as a universal control station for a variety of plasma torches PT. The torch is used to cut, weld or otherwise process a workpiece, not shown, which is grounded by a standard clamp 10. Plasma torch PT has a normal construction which includes a housing 20 with an outlet 22 and trigger 24 for selectively actuating the torch. A flexible cable 30 extends from housing 20 to plug or connector 32 which mates with and is connected to an appropriate socket 34 fixedly mounted onto control station PS. The control station is employed for the purpose of directing electrical energy to housing 20 of torch PT and also includes gas and, optionally, water inlet conduits which are directed to appropriate conduits in flexible cable 30 from plug 30 to housing 20 in accordance with standard practice. In operation, clamp 10 is manually attached to the workpiece and the power supply PS is energized. Trigger 24 is depressed to cause a plasma to issue from outlet 22 for the purpose of performing the desired heating function. Torch assembly PT includes housing 20, flexible cable 30 and plug 32; however, housing 20 is sometimes referred to as the torch. An operator manually connects plug 32 with socket 34 and actuates power supply PS by either the high current switch 36 or the lower current switch 38. In addition, the amount of air or gas to outlet 22 is adjusted by knobs 40, 42. Each time a different torch is employed, the current is selected by switches 36, 38 and the current is adjusted by either knob 36a or knob 38a. In addition, the knobs 40, 42 adjust the gas flow and/or air flow which is directed to housing 20 for creating the plasma that issues from outlet 22. As can be seen, whenever a particular torch PT is connected to the power supply, appropriate adjustments must be made by the operator. If the wrong torch is selected, it can be seriously damaged or will operate inefficiently. To prevent such occurrences, elaborate systems are now employed for coding the various plasma torches for identification by the operator when the torch is connected to the power supply PS.

Referring now to FIGS. 2 and 3, more details of plasma torch PT are illustrated. In accordance with normal practice, the torch includes a nozzle 44 and a central electrode 46. Conduit 50 directs cooling gases in the passage between housing 20 and nozzle 44. In accordance with standard practice, conduit 52 directs a plasma sustaining gas in the passage between electrode 46 and nozzle 44. The arc between nozzle 44 and electrode 46 is maintained by the negative voltage on line or conductor 60 and a more positive voltage is applied to line 70. The voltage differential between lines 60, 70 maintains the arc, which arc ionizes the gas in conduit 52 for forming the plasma at outlet 22. Male connectors are located on the terminal end of plug 32, as schematically illustrated in FIGS. 2 and 3. Conduit 50 terminates in nipple 50a that inserted into female receptacle 50b when plug 32 is attached to socket 34. In a like manner, nipple 52a is inserted into receptacle or female coupling 52b when the plug and socket are assembled. In accordance with standard practice, connectors or terminals 62, 72 are received in companion receptacles 64, 74 of socket 34. A variety of electrical lines 80, 82 and 84 are also electrically connected when plug 32 is manually inserted into socket 34. The electrical lines, together with the gas conduits and plasma power lines, are shown for illustrative purposes. A variety of electrical lines 80, 84 could be employed in operating plasma torch PT. In the illustrated embodiment, line 80 is a conductor in a safety circuit connected to housing 20, whereas lines 82, 84 form a series circuit with trigger 24 for selectively operating the plasma torch upon command of the operator. All of these electrical and gas connections can be varied and arranged in a fixed pattern dictated by the standard socket 34. The various electrical lines and fluid conduits do not form a part of the present invention, except they are automatically connected in unison as plug 32 is inserted into socket 34 and they must be set to match the torch PT. By appropriate adjustment of the electrical power and gas flow when a particular torch assembly is mounted on the power supply PS, normal and efficient operation of the plasma system is realized.

In accordance with the present invention, there is provided an identification circuit carried on the torch assembly so that the torch assembly can be identified automatically by power supply PS when plug 32 is attached to socket 34. In accordance with the preferred embodiment of the present invention, as shown in FIGS. 2 and 3, identification circuit ID is located in plug 32. This is part of the torch or the torch assembly PT so that the circuit is carried with the torch as it is brought to the power supply PS for the purposes of use in plasma cutting, welding, etc. Identification circuit ID includes an electrical characteristic or property which can be selected so that it is unique with a given torch assembly PT or a given type of torch assembly. In accordance with the preferred embodiment of the present invention, identification circuit ID is a resistor network including two selected resistors 100, 102 connected to outlet terminals 100a, 102a, respectively. A common terminal 104 connects the inwardmost end of resistors 100, 102 to the input terminal 110 in socket 34. This terminal is grounded so that a current through output terminal 112 will sense the voltage across resistor 100. In a like manner a known current from output terminal 114 will allow reading of the voltage across resistor 102. By applying a current to terminals 112, 114, in sequence, the resistance of the resistors 100, 102 can be individually read and inputted into the microprocessor or onboard computer of power supply PS. Thus, the voltage at lines 112, 114 can be read in sequence and stored as digital numbers for subsequent processing. Consequently, a combination of the resistance or resistors 100, 102 can give a substantial number of individual identification readings for torch assembly PT. Each of these values can be read as a voltage $V_A$ or a voltage $V_B$ at terminals 112, 114. By knowing voltage $V_A$ and voltage $V_B$, the identification circuit ID is read and the identity of the particular torch assembly PT is determined. In the illustrated embodiment, identification circuit ID is located in the torch assembly at plug 32. In the present unit it is located in cable 30.

Figure 4:
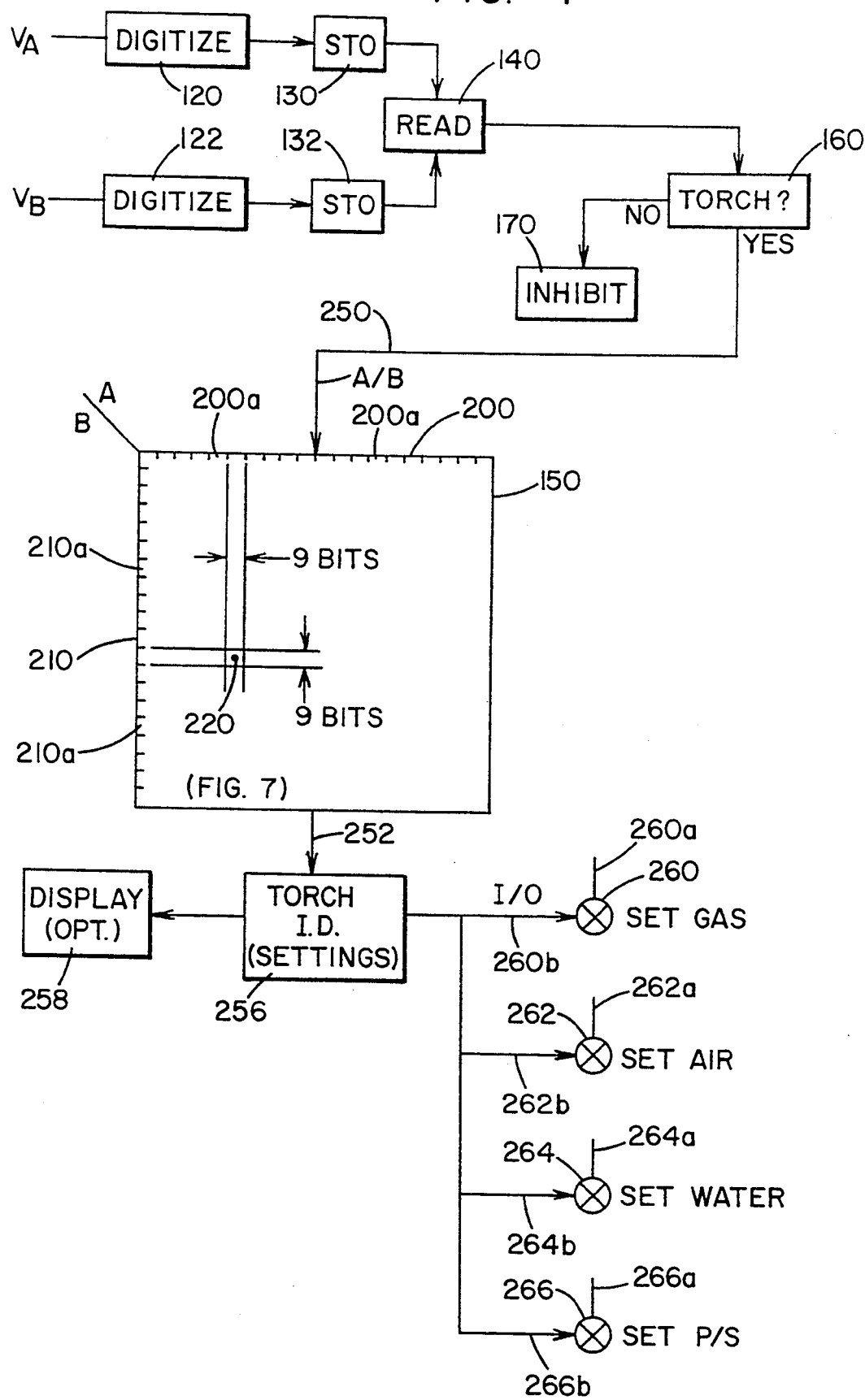
FIG. 4 is the block diagram of the processing system or program employed in the preferred embodiment of the present invention for indicating the identified plasma torch connected to the power supply.
Figure 7:
FIG. 7 is a layout drawing of the map or table actually used as the torch identification matrix in the preferred embodiment of the invention; and, FIG. 8 is a chart of the voltage ranges and associated hexidecimal number ranges for the matrix shown in FIG. 7.

A variety of arrangements could be used for reading the value of resistor 100, 102 and equating the detected or sensed values as a particular identified torch assembly. In the preferred embodiment of the present invention, the system as forth in FIG. 4 is employed wherein the voltage $V_A$ indicative of the resistance across resistor 100 is converted from an analog voltage to a digital number by a digitizing or A/D converter 120. This number representing the magnitude of resistor 100 is stored in an appropriate random access memory 130. In a like manner, the voltage $V_B$ across resistor 102 is converted to a digital number by digitizer 122 which is also an A/D converter. This number is stored in random access memory 132. The stored number in memories 130, 132 is outputted by a READ subroutine indicated as block 140 for directing the stored number in memories 130, 132 for comparison with the table of ROM 150. ROM 150 is a table for comparing the combination of resistances for resistors 100, 102 into a preselected identification scheme for various torch assemblies. The actual table is shown in FIG. 7 where R1 is the target resistance for resistor 100 and R2 is the target resistance for resistor 102. Although not employed in the embodiment of the present invention, it is possible to use a discriminating circuit 160 which indicates whether or not the digitized stored numbers in random access memories 130, 132 identifies any torch. If no torch is identified, subroutine 170 is implemented which either flags the fact that the torch is not identified or inhibits the power supply PS from further operation until overriding procedures are manually implemented by the operator. If there is a torch identified by the stored numbers in random access memories 130, 132 circuit 160 then communicates the stored numbers to the ROM 150 for identification.

In the preferred embodiment of the invention as shown in FIGS. 4 and 7, the table or map in ROM 150 includes A coordinates illustrated as line 200. These coordinates are divided into twenty generally equal segments having approximately 9 bits of width. This bit width is obtained through dividing the operational range of 0.40 volts by 20, given the voltage per bit determined by dividing the 5.5 volt logic power supply by 255 bits to produce 20 equal numerical segments 200a. In a like manner, the B coordinates are illustrated as extending along line 210 and having 20 substantially equal numerical segments 210a. Thus, the two dimensional digital grid of ROM 150 has numerical segments, or areas, 220 with a A numerical width of approximately 9 bits and a B width of approximately 9 bits. Thus, there is a matrix of 20 times 20 individual identifying areas, each of which area is approximately 9 digits on each side. This gives approximately 400 identifying areas in ROM 150 for resistors 100, 102. By adjusting the resistance of each of these resistors to be digitized to be located generally in the center of an area 220, a substantial tolerance is obtainable for the values of resistors 100, 102 in this preferred embodiment of the invention. Minor variations in the voltages across resistors 100, 102 do not provide sufficient deviation to misidentify a particular torch assembly PT. FIG. 8 is a chart of the target voltages and the target hexadecimal numbers for ROM table 150 as shown in detail in FIG. 7. Other arrangements could be employed for the purposes of torch identification; however, this particular arrangement has proven inexpensive and easily implemented. If a greater number of torches are to be identified, an additional resistor could be employed in the identification circuit to create a third or additional voltage which would be identifiable in a three dimensional numerical grid or by series interrogation of two dimensional numerical grids. The numbers from memories 130, 132 are directed to map or ROM 150 by a program schematically shown as line 250. The identity of the torch from ROM 150 is communicated by line 252 with subroutine 256. This line represents the identification output subroutine which can control an operator display unit 258. Thus, the name or identification of the torch can be displayed at unit 258 after the torch has been identified. As so far described, the invention is completed. The particular torch assembly PT has been identified. The identity of the torch can be displayed at unit 258.

In accordance with still a further aspect of the invention, after the torch has been identified, the various desired operating parameters of the control station are interrogated and compared with known values or set, as indicated by servo devices and/or comparing circuits 260, 262, 264, and 266 in FIG. 4. This closes the loop in the system and/or method of the present invention. After the torch has been identified, the desired setting for the power supply in line 266b is compared with the actual setting of the power supply in line 266a. If the setting is not proper, device 266 is adjusted by a feedback arrangement such as a standard error amplifier network between the values on lines 266a, 266b. This system can, in this manner, be a close loop system to set the power level to the desired value. In a like manner, the actual setting for the water is directed by line 264a to device 264 when it is compared with the desired setting in line 264b. The actual setting is communicated by line 264a to device 264. The same system is employed for the air and gas controlled by servo devices 262 and 260. Desired values in lines 262b, 260b can be compared with the actual settings as indicated by line 262a, 260a, respectively. Thus, the I/O output for subroutine 256 can either be a closed circuit network in accordance with standard practice for adjusting the actual settings of power supply PS to the desired values or can merely indicate that there is an error or that an adjustment must be made. Devices 260–266 can be merely comparing circuits for indicating differences between the actual values and the outputted desired values from subroutine 256. All of these uses of the identification circuit for the torches can be employed or other uses can be implemented by using the present invention, which is an identification circuit carried by the torch.

Figure 5:
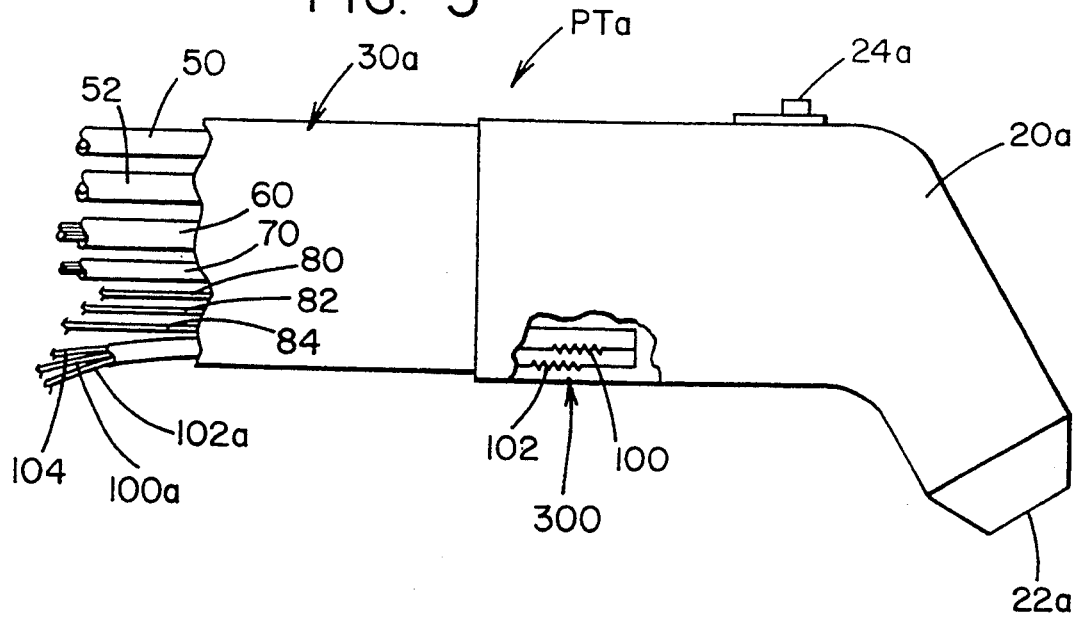
FIG. 5 is an enlarged cross sectional view showing a modification of the present invention wherein the identification circuit is located in the torch housing.

A modification of the previously described embodiment of the invention is illustrated in FIG. 5 wherein housing 20a includes an outlet 22a and a control trigger 24a. Flexible cable 30a includes the conduits and electrical lines previously described except terminals 100a, 102a and 104 are now electrical lines extending through flexible cable 30a to housing 20a. Identification circuit 300 is fixed onto housing 20a and includes resistors 100, 102, as previously described. Torch assembly PTa includes the assembled cable, combination of the housing and the connector plug. In this embodiment of the invention, the identification circuit is in the housing of the torch assembly. Thus, the identification circuit is affixed to and associated with the operating mechanism of the torch. In this manner, there is no possibility of inadvertently applying the wrong plug 32 for a particular housing 20. Location of the identification circuit in housing 20 is preferred and is now employed in practice. However, the identification circuit could be located anywhere on the torch assembly.

Figure 6:
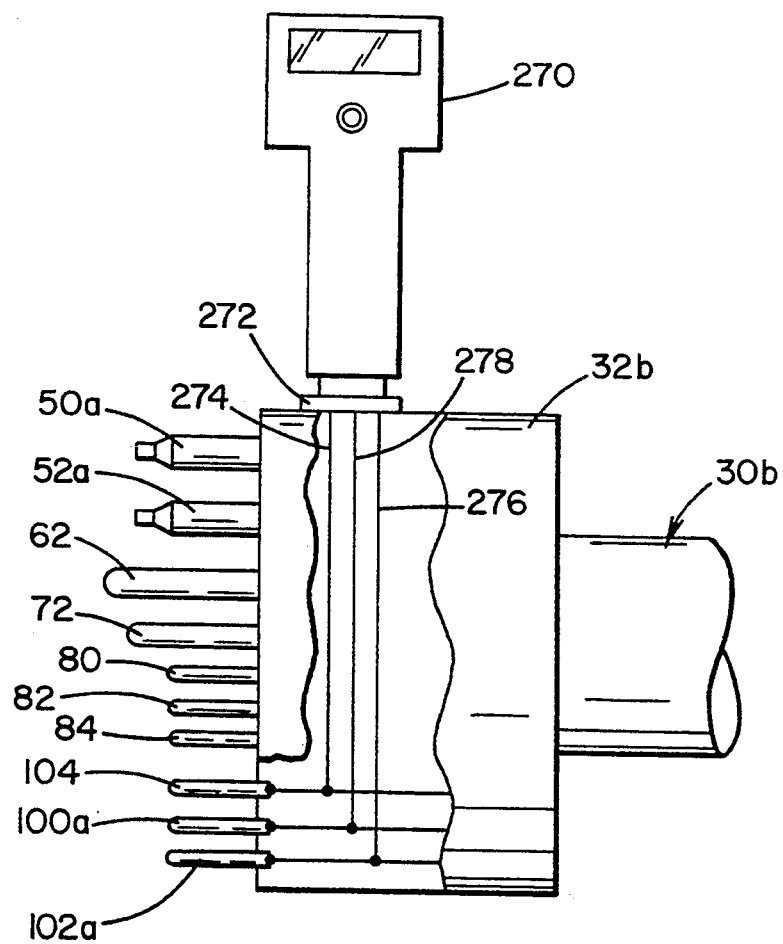
FIG. 6 is an enlarged view somewhat similar to FIG. 3 illustrating an optional identification mechanism contemplated by the present invention.

A further aspect of the invention is schematically illustrated in FIG. 6 wherein a hand held identifying device 270 is employed for reading the identification circuit in the torch assembly. Plug 32b is attached to the end of flexible cable 30b. An auxiliary outlet socket 272 connects device 270 with lines 274, 276, 278, which lines are connected to and readable in the same manner as terminals 104, 102a, and 100a, respectively. Device 270 includes an inboard microprocessor configured in accordance with the block diagram shown in FIG. 4, except for the I/O network. Thus, the information in display device or unit 258 is exhibited to an operator by device 270. The operator can determine the identification of the torch assembly without requiring the torch assembly to be connected directly onto socket 34 of power supply PS. The device 270 can be employed as the sole arrangement for determining the identity of the plasma torch assembly or can be used during the construction, manufacture and/or reassembling of a torch assembly.

The present invention has been shown as a method, system and improved torch for identifying plasma torch assemblies so that the proper torch assembly or the proper operating parameters are employed with a torch having particular characteristics. This same concept could be employed for other torches which are connected to power supplies, such as electric arc torches. The connector or plug of an electric arc welding torch could contain an identification circuit to indicate whether the torch or installation is to be used as a stick welder, a TIG welder or other welder. Then an appropriate adjustment could be made at the power supply for controlling the flow of shielding gas. In addition, the invention could be employed for the purpose of identifying the particular welding torch or plasma torch assembly. This information can be used for a variety of purposes. In accordance with the present invention, when the power supply is an inverter, accurate control may be maintained so that specific welding characteristics or plasma operating characteristics are obtainable.

Although one or two resistors are preferred for the identification circuit in the torch assembly, it is believed that a chip having electrical indicia applied thereto could be employed in either the housing 20, cable 30 or plug 32 for the purposes of interrogating the chip and using external processing circuitry for determining the identity of a selected torch assembly. Other arrangements for creating electrical properties which will have distinct and separate values for the purposes of identification can be employed in practicing the present invention.

A power supply using the present method and system will have a receptacle or socket into which plug 32 will be inserted. Each of the torches will contain a matching plug 32. The plug and receptacle or socket, in accordance with one aspect of the invention, will allow the power source to recognize which torch is connected. In this instance, plug 32 may have the identification circuit and be separate and distinct from both the torch and socket. In practice the identification circuit is actually located in cable 30 of the torch assembly. It will be ultimately located in plug 32. The identification plug could be used with various power supplies. This may be beneficial when adapting a standard torch assembly to use in the present invention. Based upon the information which identifies the torch, the power supply can change its internal characteristics to match the torch. The output current, power, voltage and cutting duty cycle may be altered or limited in order to protect the torch assembly or to change the operation of the torch assembly in accordance with the feedback or servo principles. In addition, a plasma power supply may be converted to a constant current welding power supply by a proper identification of a welding torch as opposed to a plasma torch being connected to the power supply. By using the present invention, a product line can include several power supplies together with several torches and the torches and power supplies can be interchangeable without damage to the equipment. As an example, if the product line includes four different power supplies and four different torches, there is a possible combination of twenty-four possible plasma systems. Thus, the power supply and the torches can be mixed and matched while still protecting the equipment.

Having thus defined the invention, the following is claimed:

1. In a torch assembly including a torch having specific characteristics determinative of the desired operating parameters of said torch, said torch assembly having connector means for selectively connecting said torch to a universal control station for providing electrical power and gas to said torch which are to match said operating parameters, the improvement comprising: said torch assembly including identification circuit means including two resistors for identifying said torch, said identification circuit means having an electrical property unique to said specific characteristics of said torch, said electrical property being the resistance of each of said resistors; and means for interrogating said identification circuit means to sense said electrical property.

2. The torch assembly of claim 1, wherein said interrogating means includes means for detecting the individual resistance of each of said resistors.

3. The improvement as defined in claim 1, wherein said torch includes a housing, and means for locating said identification circuit means in said torch housing.

4. The improvement as defined in claim 1, wherein said torch includes a housing and wherein said connector means includes a mounting plug and a flexible cable extending between said plug and said housing.

5. The improvement as defined in claim 4, including means for locating said identification circuit means in said plug.

6. A system for automatically identifying a torch having specific characteristics determinative of the desired operating parameters of said torch, said torch having connector means for selectively connecting said torch to a universal control station for providing electrical power and gas to said torch which are to match said operating parameters, an identification circuit means having a resistor network including at least two resistors for identifying said torch, said identification circuit means being in one of said torch and said connector means and having an electrical property unique to said specific characteristics of said torch, said electrical property being the resistance of each said resistors, and means for interrogating said identification circuit means to sense said electrical property.

7. The system of claim 6, further including means on said universal control station for activating said interrogation means when said torch is connected to said universal control station and means external of said torch for reading said electrical property of said identification circuit means when said interrogation means is activated, said reading means including means for detecting the individual resistance of each of said resistors.

8. The system of claim 6, wherein said torch includes a housing, and means for locating said identification circuit means in said torch housing.

9. The system of claim 6, wherein said torch includes a housing and said connector means includes a mounting plug and a flexible cable extending between said plug and said housing.

10. The system of claim 9, including means for locating said identification circuit means in said plug.

11. In a torch assembly including a torch having specific characteristics determinative of the desired operating parameters of said torch, said torch assembly having connector means for selectively connecting said torch to a universal control station for providing electrical power and gas to said torch to match said operating parameters, the improvement comprising: identification circuit means in said torch assembly for identifying said torch, said identification circuit means having an electrical property unique to said specific characteristics of said torch, and means for interrogating said identification circuit means to sense said electrical property.

12. The improvement as defined in claim 11, wherein said identification circuit means includes a resistor and said electrical property is the approximate resistance of said resistor.

13. The improvement as defined in claim 12, wherein said means for interrogating said identification circuit includes means for allowing a current of a known value to be passed through said resistor whereby the voltage across said resistor is said electrical property.

14. The improvement as defined in claim 13, wherein said torch assembly includes a housing and means for locating said identification circuit means in said housing.

15. The improvement as defined in claim 13, wherein said torch assembly includes a housing and wherein said connector means includes a mounting plug and a flexible cable extending between said plug and said housing.

16. The improvement as defined in claim 15, including means for locating said identification circuit means in said plug.

17. The improvement as defined in claim 12, wherein said torch assembly includes a housing and means for locating said identification circuit means in said housing.

18. The improvement as defined in claim 12, wherein said torch assembly includes a housing and wherein said connector means includes a mounting plug and a flexible cable extending between said plug and said housing.

19. The improvement as defined in claim 18, including means for locating said identification circuit means in said plug.

20. The improvement as defined in claim 11, wherein said torch assembly includes a housing and means for locating said identification circuit means in said housing.

21. The improvement as defined in claim 11, wherein said torch assembly includes a housing and wherein said connector means includes a mounting plug and a flexible cable extending between said plug and said housing.

22. The improvement as defined in claim 11, including means for locating said identification circuit means in said plug.

23. A system for automatically identifying a torch in a torch assembly having specific characteristics determinative of the desired operating parameters of said torch, said torch assembly having connector means for selectively connecting said torch assembly to a universal control station for providing electrical power and gas to said torch which are to match said operating parameters, said torch assembly including identification circuit means for identifying said torch, said identification circuit means having an electrical property unique to said specific characteristics of said torch, means for interrogating said identification circuit means to sense said electrical property, and means at said universal control station for adjusting the power and gas to match said operating parameters in accordance with said sensed electrical property.

24. A system as defined in claim 23, and means external of said torch assembly for reading said electrical property of said identification circuit means when said interrogation means is activated.

25. A system as defined in claim 23, wherein said identification circuit means of said torch assembly includes a resistor and said electrical property is the resistance of said resistor.

26. A method of automatically identifying a torch assembly including a torch having specific characteristics determinative of the desired operating parameters of said torch, said torch assembly having connector means for selectively connecting said torch assembly to a universal control station for providing electrical power and gas to said torch which are to match said operating parameters, said method comprising the steps of:

(a) providing an identification circuit fixedly associated with said torch assembly for identifying said torch wherein said identification circuit has an electrical property unique to said specific characteristics of said torch; and, (b) interrogating said identification circuit to sense said electrical property.

27. A method as defined in claim 26, including the additional step of:

(c) comparing said sensed electrical property to a table identifying specific torches by said electrical property.

28. A method as defined in claim 27, including the additional step of:

(d) setting desired operating parameters for said identified torch.

29. A method as defined in claim 28, wherein said torch assembly is a plasma torch and said desired operating parameters includes arc current and plasma gas.

30. A method as defined in claim 26, including the additional step of:

(c) inhibiting said control station if said sensed property is a preselected value indicative of an unidentified torch.

* * * * *